United States Patent [19]
Wu et al.

[11] Patent Number: 4,823,298
[45] Date of Patent: Apr. 18, 1989

[54] CIRCUITRY FOR APPROXIMATING THE CONTROL SIGNAL FOR A BTSC SPECTRAL EXPANDER

[75] Inventors: Hai-Ping Wu, Princeton Jct.; Ronald Kolczynski, Hamilton Township, Mercer County, both of N.J.

[73] Assignee: RCA Licensing Corporation, Princeton, N.J.

[21] Appl. No.: 48,428

[22] Filed: May 11, 1987

[51] Int. Cl.$^4$ .............................................. G06F 7/38
[52] U.S. Cl. ................................. 364/735; 364/715.01
[58] Field of Search ................. 364/715, 735, 768, 724

[56] References Cited

U.S. PATENT DOCUMENTS

| | | | |
|---|---|---|---|
| 3,564,222 | 2/1971 | Hackensack et al. | 364/735 |
| 3,789,203 | 1/1974 | Catherall et al. | 364/735 X |
| 3,962,573 | 6/1976 | Staley | 364/735 |
| 4,513,388 | 4/1985 | Veendrick et al. | 364/735 X |
| 4,760,542 | 7/1988 | Mehrgardt et al. | 364/724 |

Primary Examiner—Gary V. Harkcom
Assistant Examiner—Tan V. Mai
Attorney, Agent, or Firm—E. M. Whitacre; E. P. Herrmann

[57] ABSTRACT

Apparatus for approximating a signal k(b) useful in controlling a Broadcast Television Systems Committee (BTSC) expander circuit where $k(b) = R(b+1)/(b+51)$ and b is the root-mean-square (RMS) value of an applied signal. In order to generate the control signal k(b), the signal, b, is scaled by a first coefficient. The signal, b, is squared and scaled by a second coefficient. The scaled signal and the squared and scaled signal are combined with a constant value to produce a signal approximating the signal k(b).

8 Claims, 5 Drawing Sheets

CIRCUITRY FOR APPROXIMATING THE CONTROL SIGNAL FOR A BTSC SPECTRAL EXPANDER

This invention relates to TV stereo sound and more particularly to apparatus for generating control signals for controlling a spectral expander.

BACKGROUND OF THE INVENTION

On the recommendation of the Broadcast Television Systems Committee (BTSC), the audio signal standard adopted for Multichannel Television Sound incorporates compression/expansion of the stereophonic difference signal and the secondary audio program (SAP) signal. At the transmitter the stereophonic difference signal and the SAP signal are compressed to enhance signal to noise ratio. Receivers adapted to faithfully reproduce these signals include expander circuitry which operate on the stereophonic difference and SAP signals with a transfer function which is the inverse of the compression function. The expander transfer function, T(f,b), according to the BTSC standard is defined by the equation $$T(f,b) = \frac{1 + j\left(\frac{f}{20.1 \text{ KHz}}\right)\left(\frac{1 + 51b}{b + 1}\right)}{1 + j\left(\frac{f}{20.1 \text{ KHz}}\right)\left(\frac{b + 51}{b + 1}\right)} \quad (1)$$

where j is the conventional imaginary operator, f is the signal frequency and b is the root mean square value of the signal to be expanded.

The transfer function T(f,b) requires a number of division operations which, in general, require relatively complex circuitry to implement. This is particularly so if the audio signal is to be processed in digital format. It has been determined that a digital transfer function H(Z,k) which closely approximates the transfer function T(f,b) is defined by $$H(Z,k) = \frac{(2k - 1) + (Ak - 2k + 1) Z^{-1}}{1 + (Ak - 1) Z^{-1}} \quad (2)$$

where Z is the conventional Z transform variable, A is a mapping constant equal to $2\pi(20.1 \text{ KHz})/26(f_s)$ and k is related to the root mean square variable "b" by the equation $$k = \frac{26(b + 1)}{b + 51} \quad (3)$$

The factor $f_s$ in the mapping constant A is the sample rate of the digital audio samples.

The transfer function H(Z,k) may be realized without using any variable divider circuits, thus, simplifying the expander circuitry. However, such an expander system requires apparatus to derive the variable, k, from the root mean square value, b, of the signal to be expanded. This invention is directed toward deriving the control variable, k, from the variable b.

From the function defining the variable k it will be seen that a straight forward generation of the variable k from the variable b requires division. Division in real time processing is undesirable because of circuit complexity. It is therefore an object of this invention to derive the variable, k, with a minimum of circuitry hardware.

SUMMARY OF THE INVENTION

The present invention is directed toward circuitry for approximating the function $$k = R(b+1)/(b+51)$$

where R is a constant and b is a variable in the form of a sampled data signal. The sampled data signal b is scaled by a first constant and applied to a combining circuit. Samples corresponding to the square of the sampled data signal b are scaled by a second constant and applied to the combining circuit. The combining circuitry algebraically combines a third constant, the scaled sample corresponding to the square of the sampled data signal, b, and the scaled sampled data signal, b, to produce the variable k(b) approximating R(b+1)/(b+51).

DETAILED DESCRIPTION

Figure 1:
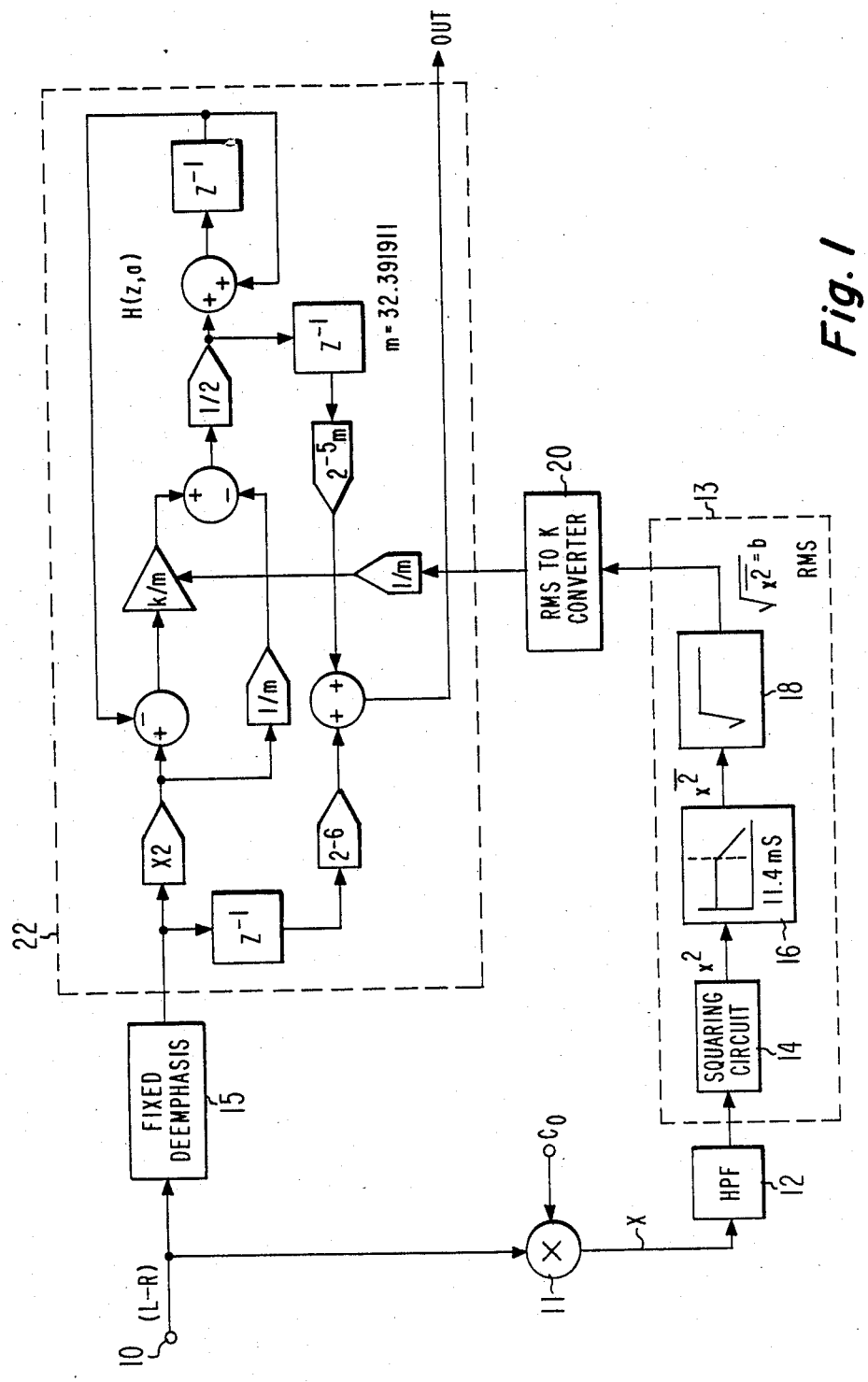
FIG. 1 is a block diagram of a signal expander including circuitry exhibiting the transfer function H(Z,k).

FIG. 1 illustrates circuitry which may be utilized in a multichannel TV sound receiver for performing spectral expansion of the audio stereo difference signal (L-R) and wherein the invention may be advantageously implemented. The stereo difference signal (L-R), which may be derived from a synchronous AM demodulator (not shown) and assumed for illustrative purposes to be in digital sampled data format, is applied to input terminal 10. This signal is coupled to a fixed de-emphasis circuit 15 which attenuates higher frequency signal components. The output of the fixed de-emphasis circuit 15 is coupled to the input terminal of the spectral expander 22 which amplifies/attenuates higher frequency signal components as a function of the RMS signal value. In this example, control of the expander is provided by the control signal, k, which is functionally related to the RMS value b of the (L-R) signal according to the equation $$k = R(b+1)/(b+51) \quad (4)$$

Circuit analysis of expander 22 will reveal its transfer function to be $$H(Z,k) = (1/64)\left[\frac{(2k - 1) + (k/(2m) - 2k + 1) Z^{-1}}{1 + (k/(2m) - 1) Z^{-1}}\right]Z^{-1} \quad (5)$$

In expander 22, the control signal, k, and the signal being processed are scaled by the factor 1/m and/or the factor $2^{-6}$. This is done in the illustrated example to maintain the processed signal amplitude within a range of values to prevent overflows. The effect of scaling by 1/m is ultimately counteracted by scaling the processed signal by m (in the scaler designated $2^{-5}m$). If the scale factor m is made equal to ½A, equation (5) reduces to equation (2), with the exception that it is scaled by (1/64) and it is delayed by one sample period.

The expander 22 is comprised of only delay elements designated $Z^{-1}$, adders, subtracters, constant scalers, and one variable multiplier, and, thus, is relatively straight forward to implement. If the circuit elements are provided with sufficient bit capacity that value overflows are not a consideration, then the scaling elements designated 1/m, $2^{-6}$, and $2^{-5}m$ may be eliminated from the expander.

To generate the control signal, the stereo difference signal at input terminal 10 is coupled to a multiplier 11 wherein the signal is scaled by a constant C0. The factor C0 is user adjustable and provides some user control over the expander by virtue of effecting changes to the control signal k. The output signal from multiplier 11 is coupled to a high-pass filter 12. High-pass filter 12, has a lower 3 dB roll-off point at a frequency of 7 KHz, to limit the energy sensed by the RMS detector to the high frequency energy spectra of most program material. The signal provided by the highpass filter 12 is coupled to the RMS detector 13 including the cascade connection of a squaring circuit, 14, an averaging circuit, 16, and a square root circuit, 18. Squaring circuit 14 may be a multiplier having both its multiplier and multiplicand input terminals coupled to the bandpass filter 12. Averaging circuit 16 is typically realized with a low-pass filter having a weighting interval of 11.4 msec. An example of a square root circuit which may be implemented for element 18 is disclosed in U.S. Pat. No. 4,757,467, filed May 15, 1986, entitled "Apparatus For Estimating The Square Root Of Digital Samples", assigned to the same assignee as the present invention.

The output of the square root circuit 13 is coupled to the RMS-to-control signal converter 20.

The function $k=R(b+1)/(b+51)$ may be realized without performing variable division by implementation of a series expansion of the function, such as a Taylor series expansion. It has been found, however, that in order to obtain a relatively accurate approximation by the series expansion, that a significant number of the series terms are required resulting in polynomials in "b" to at least the 4th power. Generating high order polynomials in hardware undesirably tends to require relatively complex circuitry. The present inventors found that the function k(b) could be closely approximated by forming a polynomial comprised of the first few terms $P_i(x)$ of Legendre polynomials and fitting coefficients, $g_i$, to the contributing Legendre polynomials. In particular, the first three polynomials $P_0(x)$, $P_1(x)$ and $P_2(x)$, which are defined as $P_0(x)=1$
$P_1(x)=x$
$P_2(x)=(3x^2-1)/2$ are summed in the proportions $$Q(x)=g_{0i}\,P_0(x)+g_1P_1(x)+g_2P_2(x) \quad (7)$$

Using a least square error approach to the difference $k(x)-Q(x)$ the coefficients $g_i$ are resolved and then the coefficients, $C_i$, for the powers of the variable x in the expanded polynomial are determined.

Substituting b for x, an expanded polynomial which closely approximates the function k(b) is given by $$k(b)=0.509784+0.4961900b-0.0072318b^2. \quad (8)$$

The coefficients in equation (8) are valid provided the variable b is constrained to the range of $\pm 1$. If the variable b is expected to exceed this range, the system may be rearranged to process x=b/C4 (C4 being a constant). In this instance, equation (8) takes the form $$k(x)=0.509784+0.4961900(C4)x-0.0072318(C4)^2x^2 \quad (9)$$

Figure 2:
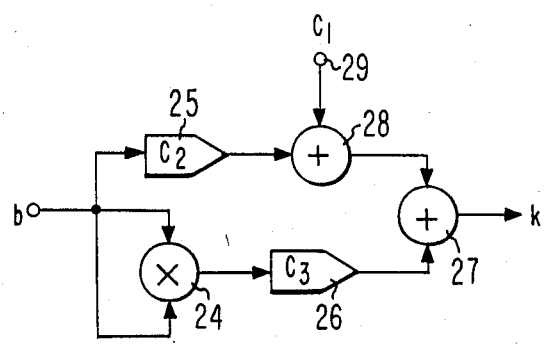
FIGS. 2 and 3 are block diagrams of circuitry, embodying the present invention, for generating a variable k(b) which approximates the function R(b+1)/(b+51).

FIG. 2 illustrates the control signal converter 20 in general schematic form. In FIG. 2, the RMS value, b, is coupled to a squaring circuit 24 and to a scaling circuit 25. Squaring circuit 24 squares the input values, b, and applies the squared values to a second scaling circuit 26. Scaling circuit 26 scales the squared values by a constant factor C3 and applies the scaled values to one input terminal of adder 27.

Scaling circuit 25 scales the input values, b, by a constant factor C2 and applies the scaled values to one input terminal of a second adder 28. A constant value C1, from terminal 29, is applied to a second input terminal of adder 28, the output of which equals C1+C2b. The output sums from adder 28 are applied to a second input terminal of adder 27, the output of which is the control signal, k, given by $$k=C1+C2b+C3b^2. \quad (10)$$

The scale factors C1, C2 and C3 as exemplified in equation (8) are $$C1=0.509784 \quad (11)$$

$$C2=0.4961900 \quad (12)$$

$$C3=-0.0072318 \quad (13)$$

or close approximations thereof to facilitate digital processing. As indicated above, if the value of b is expected to exceed $\pm 1$, it may be necessary to scale the input to the RMS detector, which scaling will scale the RMS value by a like amount. For example, if the input to the RMS detector is scaled by 1/C4, the value b will be scaled by 1/C4. Designating the input to the RMS detector x, the internal values $x^{-2}$ and $\sqrt{x^2}$ of the RMS detector correspond to $(b/C4)^2$ and b/C4 respectively. The factor C4 may be incorporated in the scale factor C0 applied to multiplier 11. In this instance, the constant scale factors in equation (10) are changed to accommodate the scaling of the input signal. For the input signal x, equation (10) becomes $$k'=C1'+xC2'+x^2C3' \quad (15)$$

where $C2'=C2C4$ and $C3'=C3C4^2$. In the serial bit implementations to be discussed, it has been found to be advantageous to scale the RMS value, b, by the factor 1/32 in which case the scale factors C1', C2' and C3' are $$C1'=0.509784 \quad (15)$$

$$C2'=15.8780814 \quad (16)$$

$$C3'=-7.4053632 \quad (17)$$

The expander circuit illustrated in FIG. 1 incorporates a scaling circuit for scaling the control signal by the factor 1/m where m was chosen to equal 32.391911. The system of FIG. 1 may be simplified by incorporating this scale factor in the RMS-to-k converter per se.

In this case, the output, k", of the RMS-to-k converter is equal to k'/m and $$k'' = k'/m = C1'' + xC''2 + x^2C''3 \quad (18)$$

wherein the coefficients are equal to $$C1'' = (C1)/m = 0.015738 \quad (19)$$

$$C2'' = (C2C4)m = 0.49018662 \quad (20)$$

$$C3'' = (C3C4_2)/m = -0.22861634 \quad (21)$$

Figure 3:
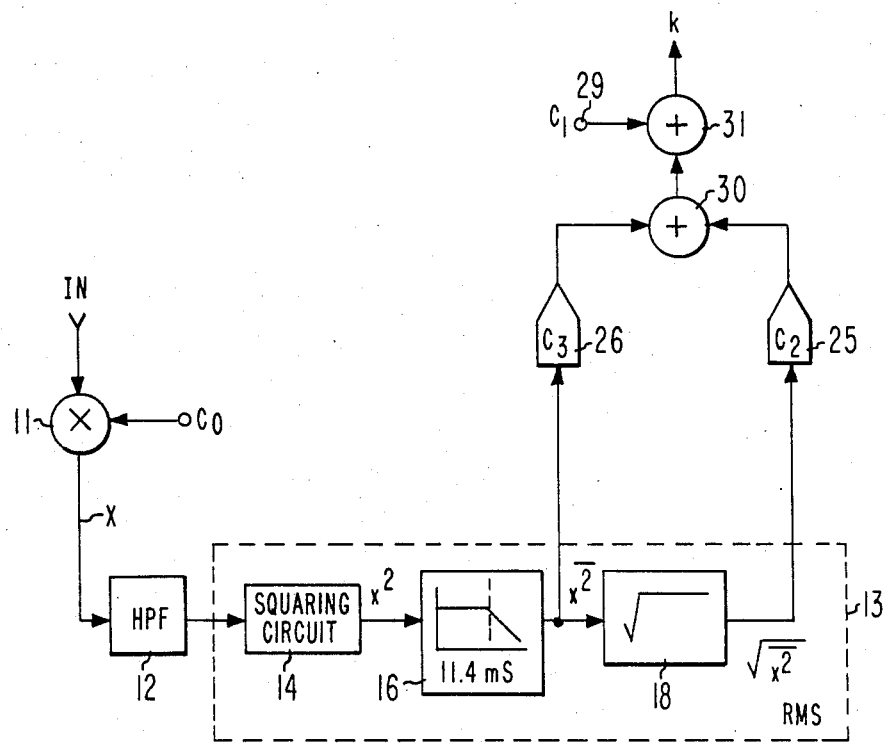

To facilitate implementation in digital form, the coefficients will nominally be approximated to be equal to values corresponding to sums of reciprocal powers of two, i.e. $\Sigma_i a_i 2^{-i}$ where the coefficients $a_i$ equal 0 or ±1. The RMS signal x and the signal $x^2$ are both available from the RMS circuit 13. This simplifies the construction of the RMS-to-k converter as illustrated in FIG. 3. In this example, the signal $x^2$ from averaging circuit 16 is coupled to the scaling circuit 26 and the RMS signal x from square root circuit 18 is coupled to scaling circuit 25. Scaled signals C2"x and C3"$x^2$ are summed in adder 30. The constant C1" is then added to these sums in adder 31. It will be appreciated that the set of coefficients C1, C2 and C3 may be chosen to equal any of the aforedescribed sets of coefficients C1, C2, C3; C1', C2', C3' or C1", C2", C3".

In a given sample period the signal x and the signal $x^2$ may not correspond to the same sample since the square root circuit 18 may have a processing delay of several sample periods. This, however, is of no consequence for several reasons. First, the signal may be oversampled to the extent that there is very little value change over several samples. Second, the averaging circuit 16 tends to remove sample to sample changes, and third, a compensating delay may be interposed between the averaging circuit 16 and the scaling circuit 26.

Because audio signals have a relatively low bandwidth, they lend themselves to bit-serial digital processing which tends to be significantly more parts efficient than parallel bit processing. Thus, several bit-serial RMS-to-k converter circuits will be described. The converter will be assumed to be in a gated-clock bit-serial system wherein (a) the samples are in two's complement format; (b) the samples occur bit seriatim with the least significant bit occurring first and sign bit last; (c) the samples are properly justified at the beginning of each sample period; and (d) the samples are n bits long, but the sample period exceeds n bit periods.

Relative to a given datum, a bit-serial sample may be multiplied or divided by integer powers of two, by delaying or advancing (shifting) the sample by the number of bit periods equal to such power of two. For example, a sample delayed by one bit period relative to the nondelayed sample assumes a value of twice the nondelayed sample and a sample advanced in time by one bit period assumes a value of one-half the nonadvanced sample.

Adding and/or subtracting delayed and/or advanced versions of a sample produces a scaled version of the sample. For example, adding a sample to a one-bit delayed (times 2) version of the sample and subtracting the sample advanced by two-bit periods (divided by 4) produces the sample scaled by 2¾. This principal is used to perform scaling of the signals x and $x^2$ by fixed constants.

Figure 4:
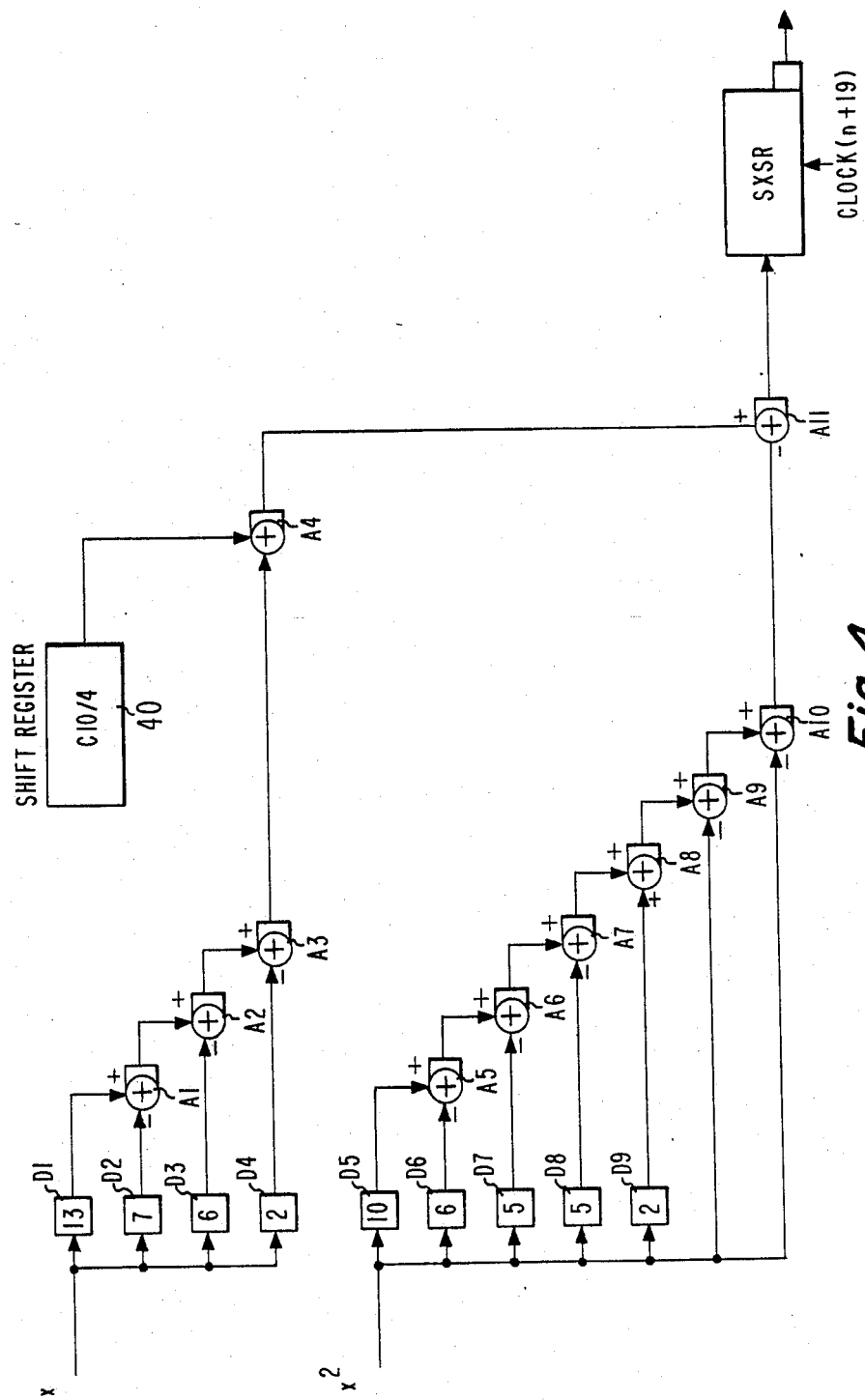
FIGS. 4–6 are block diagrams of alternative serial bit digital circuits, embodying the present invention, for generating the variable k(b) approximating the function R(b+1)/(b+51).

FIG. 4 illustrates a first bit-serial implementation which incorporates parallel delay circuits to perform bit shifting to implement sample scaling. In FIG. 4, the RMS samples x are applied to delay circuits D1-D4 which delay the sample x by 13, 7, 6 and 2 sample bit periods respectively. The sample x is relatively multiplied by the factors $2^{13}$, $2^7$, $2^6$ and $2^2$ by the delay circuits D1-D4.

The output samples from delay circuits D1-D4 are coupled to input terminals of subtracter circuits A1-A3. The subtracter circuits (and subsequent adder circuits) are each presumed to have a one bit-period inherent processing delay which effects a multiplication by two, of the difference or sum produced. Subtracter A1, coupled to delay circuits D1 and D2 produces the difference $2(2^{13}-2^7)x$. This value and the output of delay circuit D3 are applied to subtracter A2 which produces the difference $2(2(2^{13}-2^7)x-2^6x)$. The output of subtracter A2 and the output of delay circuit D4 are applied as inputs to subtracter A3 which produces the differences $2(2(2(2^{13}-2^7)x-2^6x)-2^2x)$. This output reduces to $(2^{16}-2^{10}-2^8-2^3)x$ which is coupled to adder A4 wherein it is summed with the coefficient C10/4. The output of adder A4 is $2(2^{16}-2^{10}-2^8-2^3)x+2(C10)/4$ and is applied to adder A11 wherein it is summed with the $x^2$ terms $2^{18}(C3x^2)$ to produce the sums A11S given by $$A11S = 4(2^{16}-2^{10}-2^8-2^3)x + 4(C10)/4 + 2(2^{18}(C3\cdot x^2)). \quad (22) \quad (C3x^2)$$

The output signal A11S is loaded bit seriatim into the N-bit serial shift register, SXSR, by a clock having (n+19) pulses per sample period. The extra 19 clock pulses effectively advances the bit positions of the signal A11S relative to the system datum, thereby dividing the signal samples A11S by $2^{19}$. The first term on the right hand side of equation (22), as resident in register SXSR, is $$4(2^{16} - 2^{10} - 2^8 - 2^3)/2^{19} x = (2^{-1} - 2^{-7} - 2^{-9} - 2^{-14})x \quad (23)$$
$$= 0.49017334x$$

The numerical coefficient of x in equation 23 approximates the coefficient C2" within 0.003%.

The value (C10)/4 stored in register 40 and applied to adder A4 is equal to $2^{19}$ times the coefficient C1 divided by four or $2^{17}$ times the coefficient C1 if the system is arranged to begin clocking the coefficient out of register 40 in consonance with the clocking in of the samples x and $x^2$. Alternatively, the value (C10)/4 may equal the coefficient (C1)/4 if the clocking of register 40 is not started until the 20th bit of the sample.

The scaling of the samples $x^2$ is accomplished in a similar manner, by delay circuits D5-D9 adders/subtracters A5-A11 and the clocking of register SXSR. The value corresponding to the last term on the right hand side of equation (22) when resident in register SXSR can be shown to be $$2(2^{18}C3''x^2)2^{-19} = -0.228614807x^2.$$

The coefficient of $x^2$ developed by the FIG. 4 circuit is within 0.0007 percent of the desired value C3".

Figure 5:
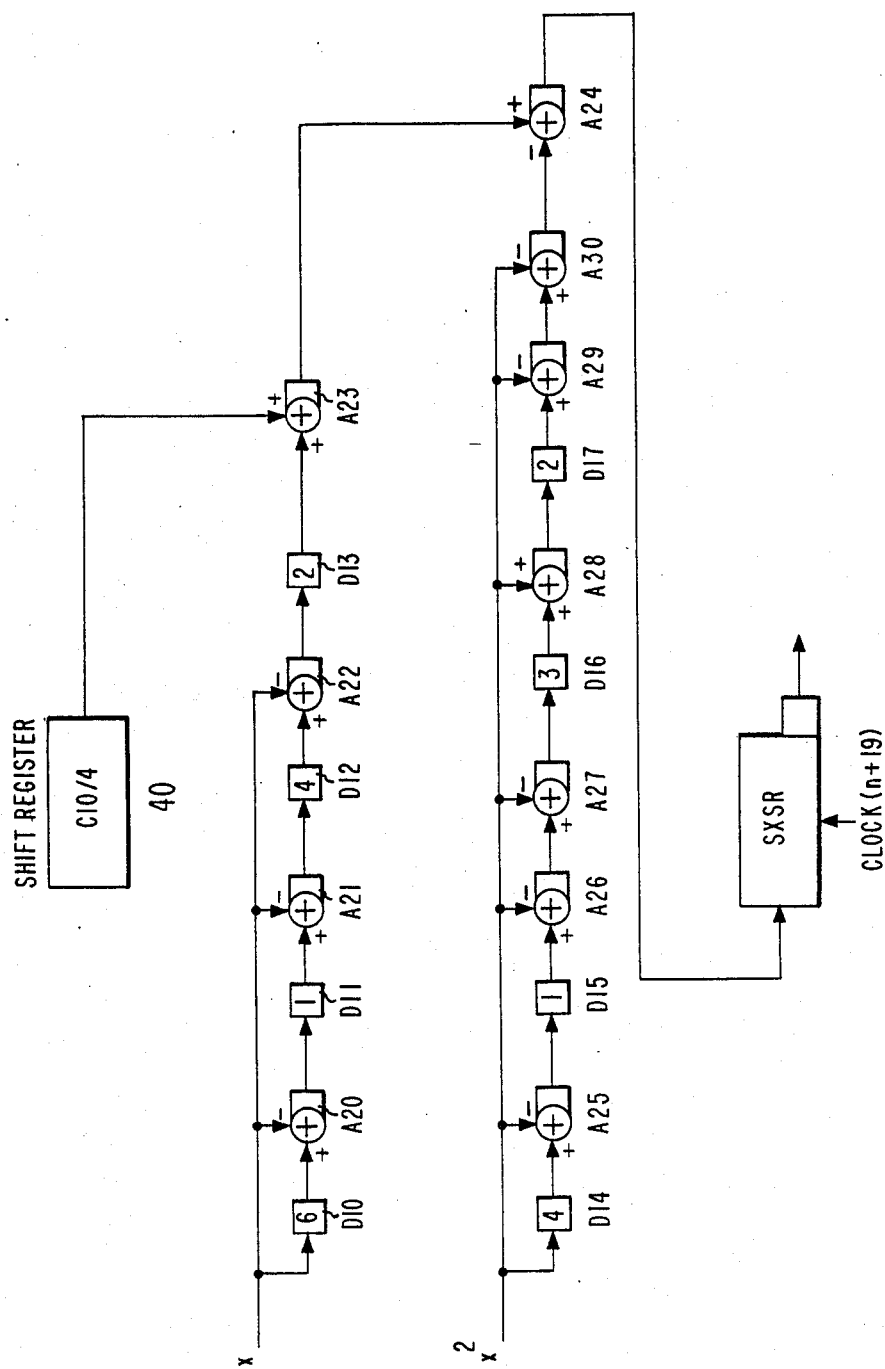

FIG. 5 is a more parts efficient embodiment of the control signal converter in that it requires fewer delay stages. In FIG. 5, the scaler for signal x consists of the cascade connection of delay circuits D10–D13 with interposed adder/subtracters A20–A24. As in FIG. 4, the adder/subtracters are assumed to have a one bit-period internal processing delay.

The input signal x is applied directly to one input of subtracter A20 and delayed by six-bit periods by delay circuit D10 (multiplied by $2^6$) and applied to the second input of subtracter A20. The difference provided by subtracter A20 is equal to $2(2^6x-x)$ or $2^7x-2x$. This difference is delayed one bit period by delay circuit D11 (multiplied by 2) and applied to one input of subtracter A21. The signal x is coupled directly to a second input of subtracter A21 which develops the difference $2(2(2^7x-2x)-x)$ or $(2^9-2^3-2)x$. The output of subtracter A21 is delayed four bit periods in delay circuit D12 (multiplied by $2^4$) and coupled to subtracter A22. The signal x is couple directly to a second input of subtracter A22 which develops the difference $2(2^4(2^9-2^3-2)x-x)$ or $(2^{14}-2^8-2^6-2x$. This value is coupled to the register SXSR through the two-bit-period delay circuit D13, adder A23 and subtracter A24. The added delays of elements D13, A23 and A24 multiplies the output of subtracter A22 by $2^4$ resulting in sample values applied to register SXSR equal to $(2^{18}-2^{12}-2^{10}-2^5)x$. This value is clocked into register SXSR with a clock having n+19 pulses so that the value in the register is equal to the output of subtracter A24 divided by $2^{19}$ or $x(2^{-1}-2^{-7}-2^{-9}-2^{-14})=0.490173340x$. The scaling coefficient for the signal x is the same as the scaling coefficient developed in the FIG. 4 circuitry. A similar analysis of the circuit elements disposed in the signal path of the signal $x^2$ will show that the signal $x^2$ is scaled by the coefficient $-0.228614807$. The constant component of the control signal k is provided from register 35 and combined with the x and $x^2$ via adder A23.

Figure 6:
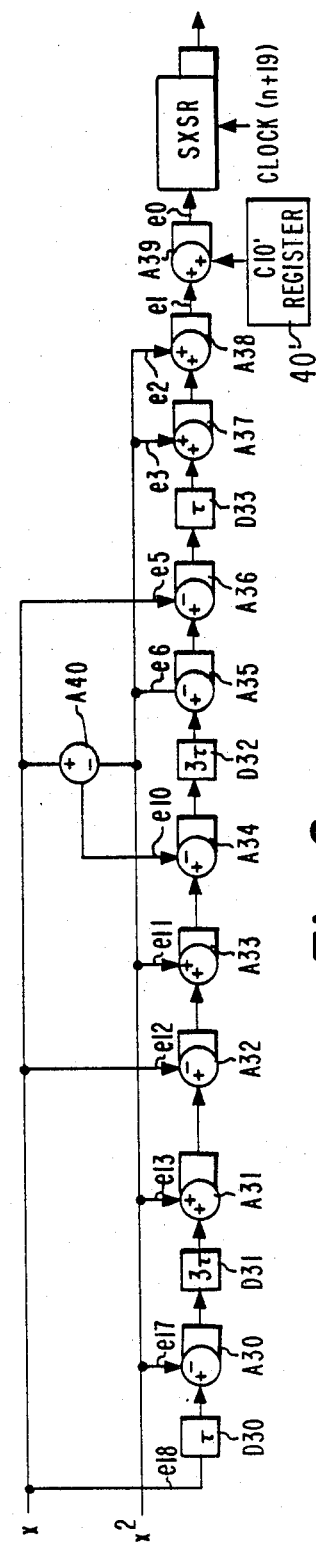

A still more parts efficient scaling circuit may be realized by the apparatus illustrated in FIG. 6 which comprises a bit-serial merged-multiplier. From either the FIG. 4 or FIG. 5 circuitry, it may be seen that the coefficient of x is developed by summing and/or differencing the signal x multiplied by powers of two (specifically $(2^{18}-2^{12}-2^{10}-2^5)x$) and dividing the result by $2^{19}$. Similarly, the coefficient of $x^2$ is developed by summing and/or differencing the signal $x^2$ multiplied by powers of two (specifically $(-2^{17}+2^{13}+2^{11}+2^{10}-2^6+2^3+2^2)x^2$) and dividing the result by $2^{19}$. The sums of products $\Sigma A_i x 2^i$ and $\Sigma_j A_j x^2 2^j$ are internally added (in adder A11 in FIG. 4) before division in the register SXSR. Ignoring the constant C1, the expanded sum, ES, that is input to the register SXSR is thus $$ES=2^{18}x-2^{17}x^2+2^{13}x^2-2^{12}x+2^{11}x^2-2^{10}(x-x^2)-2^6x^2-2^5x+2^3x^2+2^2x^2. \quad (24)$$

Only the terms $-2^{10}x$ and $2^{10}x^2$ share the same $2^{10}$ scaler, therefore, all of the other terms may be combined in a single cascade connection of adder/subtracter circuits and delay circuits. The x and $x^2$ signals may be differenced external to the cascade connected circuit and then added into the cascade circuitry with appropriate delay and sign. This arrangement tends to eliminate a number of delay circuits relative to the FIG. 5 embodiment, and is illustrated in FIG. 6.

In FIG. 6, the adder/subtracter circuits A30–A39 have a processing delay of one bit-period. The subtracter A40 for illustrative purposes is presumed not to have a processing delay, however, in practice A40 would nominally have delay. This delay would be compensated by splitting the delay element D32 into two delay circuits having delays of one and two bit-periods and moving subtracter A34 rightward between the split delay circuit. The input connections to the adder/subtracter circuits have designations e(i) where the index (i) indicates the number of delays incurred by the applied signals x and $x^2$ between their respective input terminals and the output of adder A39. With the methodology used in analysing the circuitry illustrated in FIG. 6, it can be shown that the output, OA39, of adder A39 is given by $$OA39=2C10'+2^{18}x-2^{17}x^2+2^{13}x^2-2^{12}x+2^{11}x^2-2^{10}(x-x^2)-2^6x^2-2^5x+2^3x^2+2^2x^2. \quad (25)$$

This output is loaded into the register SXSR with a clock of (n+19) pulses effectively dividing the output OA39 by $2^{19}$ to produce the desired control signal. The constant term C10' is added to the summed x and $x^2$ terms at the output end of the cascade connection. The term C10' provided by register 40' is equal to $2^{18}$C1. It should be appreciated, however, that the constant term, if appropriately scaled, can be added into the cascade connection at any convenient locations.

What is claimed is:

1. Apparatus for generating a control signal k(b) from a signal b where values of the signal k(b) are substantially equivalent to values represented by the function $k(b)=R(b+1)/(b+51)$, where R is a constant, comprising:

an input terminal for applying a signal;
   means coupled to said terminal for developing a further signal corresponding substantially to the RMS value of said signal;
   means coupled to said terminal for developing a signal corresponding substantially to the mean square of said signal;
   means for scaling said further signal by a first constant coefficient C2;
   means for scaling said mean square of said signal by a second constant coefficient C3;
   means for providing a constant value C1; and
   means for arithmetically combining said constant value C1, the further signal scaled by the constant C2 and the mean square of said signal scaled by the constant C3 to produce said control signal.

2. The apparatus set forth in claim 1 wherein said scale factors are substantially equal to

C1=0.509784

C2=0.496190

C3=−0.0072318.

3. The apparatus set forth in claim 1 wherein said means for developing said further signal includes scaling circuitry coupled to said input terminal for scaling said applied signal by a constant C0.

4. The apparatus set forth in claim 3 wherein said constant C0 includes a factor $2^{-i}$ where i is a positive integer.

5. The apparatus set forth in claim 4 wherein said scale factors are substantially equal to

C1=0.509784

$$C2 = 0.496190(2^i)$$

$$C3 = -0.0072318(2^{2i}).$$

6. The apparatus set forth in claim 5 wherein said apparatus provides a control signal k(b)/mm, being a constant and said scale factors are substantially equal to $$C1 = 0.509784/m$$

$$C2 = 0.496190(2^i)/m$$

$$C3 = -0.0072318(2^{2i})/m.$$

7. The apparatus set forth in claim 1 wherein the means for developing a signal corresponding to the mean square of said signal comprises a squaring circuit coupled to said input terminal for squaring applied signal;

means coupled to said squaring circuit, for averaging squared signals provided by said squaring circuit; and wherein said means for developing a further signal comprises means coupled to said means for averaging, for generating the square root of signal provided by said means for averaging.

8. The apparatus set forth in claim 7 wherein said means for scaling said mean square of said signal comprises a cascade connection of a plurality of delay circuits and a plurality of signal combining circuits, and said mean square of said signal is coupled to respective input terminals of said plurality of signal combining circuits, and wherein said means for scaling said further signal comprises a cascade connection of a second plurality of delay circuits and a second plurality of signal combining circuits, and said further signal is coupled to respective input terminals of said second plurality of signal combining circuits.

* * * * *